June 29, 1943.   F. M. ROGALLO   2,322,745
LATERAL CONTROL FOR AIRCRAFT
Filed Dec. 13, 1940   3 Sheets-Sheet 2
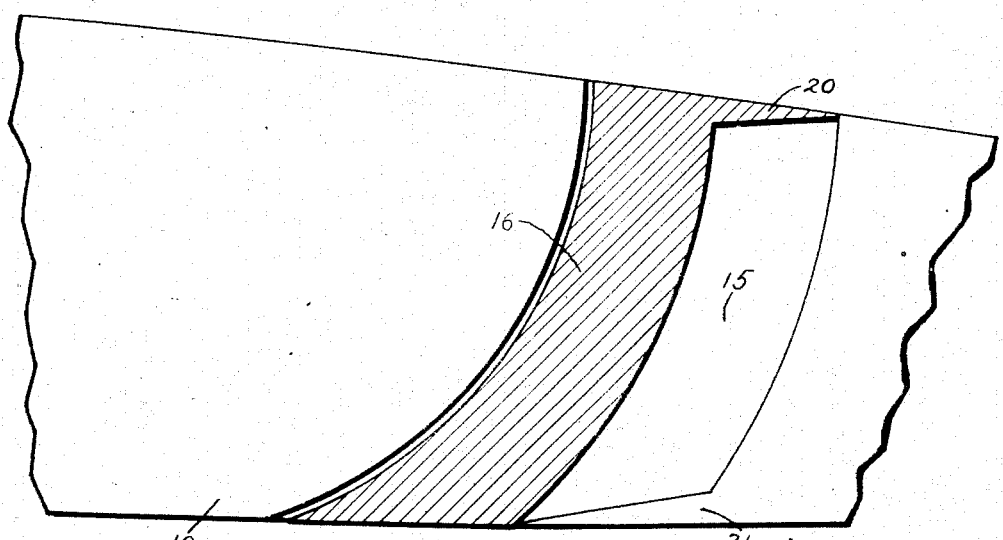
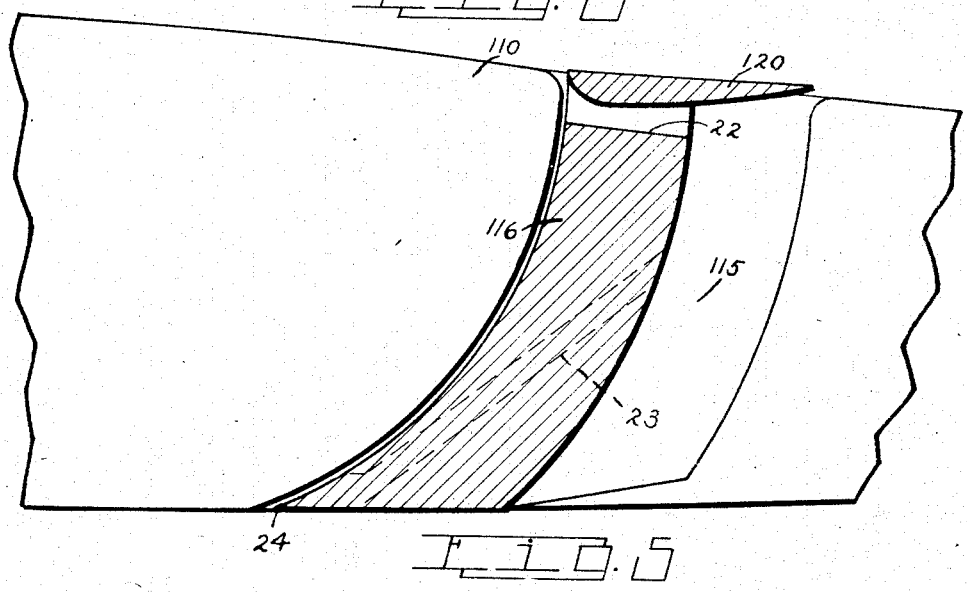
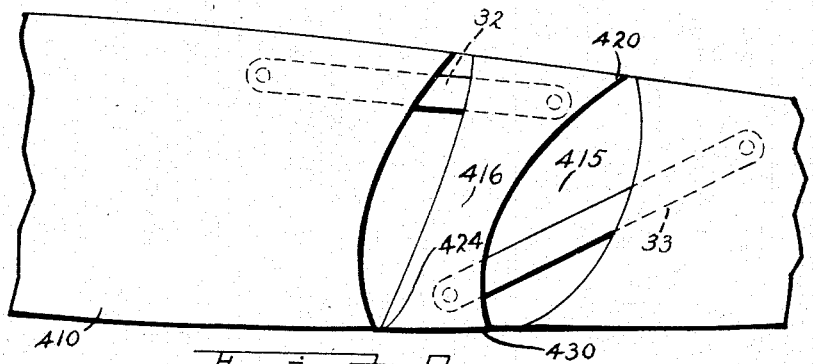
INVENTOR
F. M. ROGALLO
BY
ATTORNEY

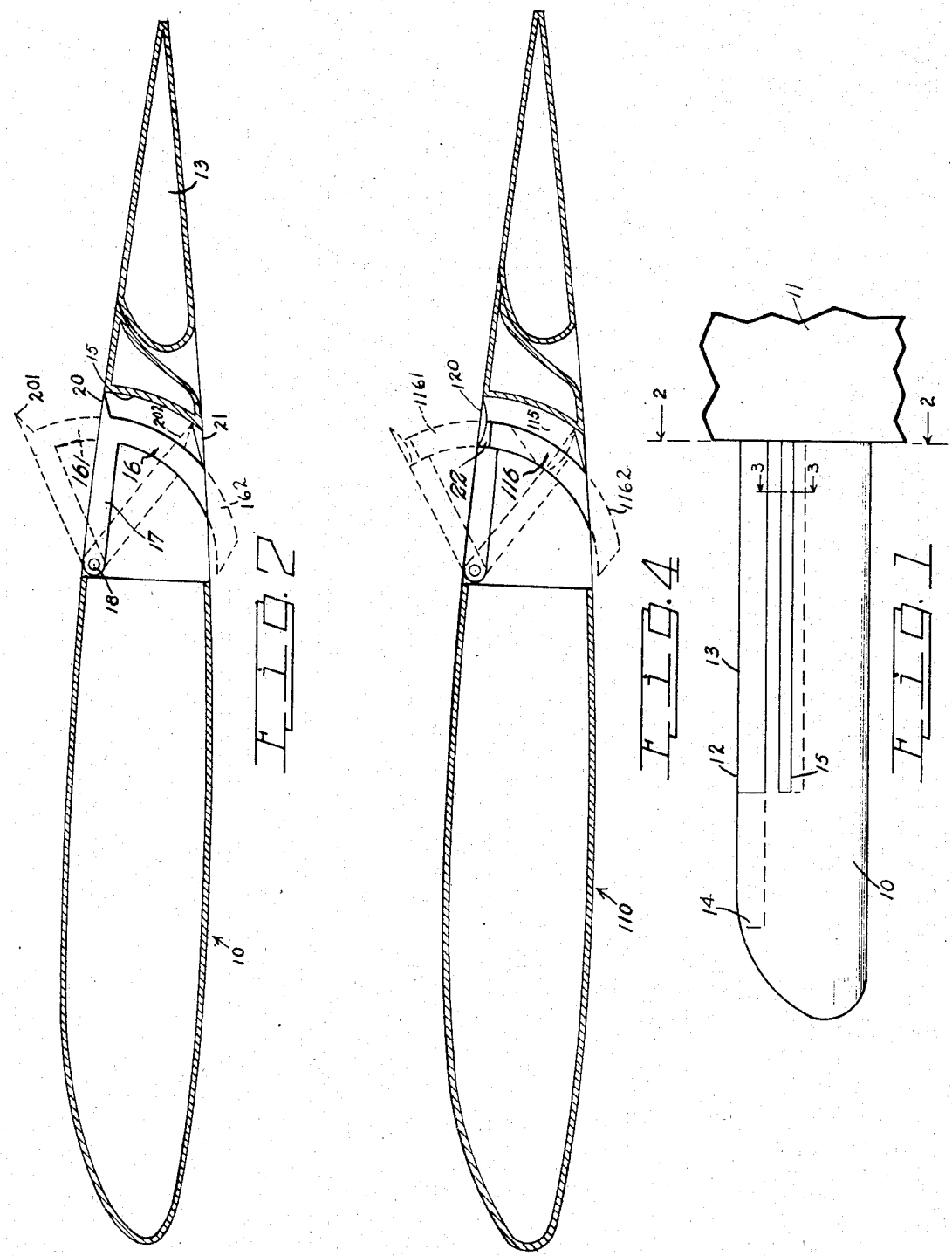

INVENTOR
F.M. ROGALLO
ATTORNEY

Patented June 29, 1943

2,322,745

UNITED STATES PATENT OFFICE 2,322,745

LATERAL CONTROL FOR AIRCRAFT

Francis Melvin Rogallo, Hampton, Va.

Application December 13, 1940, Serial No. 369,999

4 Claims. (Cl. 244—90)

(Granted under the act of March 3, 1883, as amended April 30, 1928; 370 O. G. 757)

This invention relates to lateral control for aircraft, and has for an object to provide an improved means of laterally controlling an aircraft.

A further object of this invention is to provide a lateral control means for aircraft which acts in cooperation with a slot through the aircraft wings and either completely closes the slot in both wings when in neutral position or opens the slot of one wing when extended partly above the upper wing surface, and simultaneously maintains the slot of the other wing closed when extended below the lower wing surface.

A further object of this invention is to provide a slot in an aircraft wing and to provide a plug so shaped as to completely fill the slot and to close the same when in neutral or downwardly extending position and open the slot when in upwardly extending position.

A further object of this invention is to provide a wing slot and a plug filling the same, which plug may be extended through the upper surface of the wing to serve as a spoiler or retractable aileron, and at the same time leave an opening or slot through the wing.

A further object of this invention is to provide a lateral control means which may or may not extend the full length of the aircraft wing and is located substantially forward of the trailing edge, thereby permitting the trailing edge to be provided with a full span wind brake or lift increasing device.

A further object of this invention is to provide a lateral control aileron which is retractable into the wing in neutral position, eliminating the use of external hinges such as exemplified in U. S. Patent to Weick, 2,174,542, and which may be deflected in both directions from the neutral position, thereby greatly increasing its desirability over the device shown in the aforementioned patent, as well as in Patents No. 1,902,133 and 1,857,962, which can move in only one direction from the neutral position.

A further object of this invention is to provide a retractable aileron which is located within a slot forward of the trailing edge, which serves as a plug to fill the slot when in neutral position, but leaves an opening through the wing when in upward position, whereby air flow through the slot greatly improves the hinge moment, rolling moment and time responsive characteristics of the device.

Still a further object of this invention is to provide a retractable aileron operating through a slot in the wing having the proper feel and the proper time-moment characteristics so that the pilot utilizing same will have the same feel on the manual controls that he does with the conventional trailing edge aileron, and have the same quick response as he does with the trailing edge aileron, yet at the same time has the trailing edge free of the aileron so that it may be provided with extremely desirable wind brake or lift increasing devices, thereby greatly increasing the maneuverability of the aircraft.

A further object of this invention is to provide the improved lateral control means of this invention with ice elimination features when the aircraft is apt to be used in regions where there is danger of ice formation interfering with the operation thereof.

With the foregoing and other objects in view, the invention consists in the construction, combination and arrangement of parts hereinafter described and diagrammatically illustrated in the drawings, in which:

Fig. 1 is a top plan view of an airplane wing to which this invention has been applied;

Fig. 2 is a sectional view on line 2—2 of Fig. 1;

Fig. 3 is an enlarged sectional view on line 3—3 of Fig. 1;

Fig. 4 is a sectional view, similar to Fig. 2, but of a slightly modified form;

Fig. 5 is an enlarged detail sectional view similar to Fig. 3, of the form shown in Fig. 4;

Figs. 7 and 8 show still other ways of hinging the control means of this invention.

Figure 6:
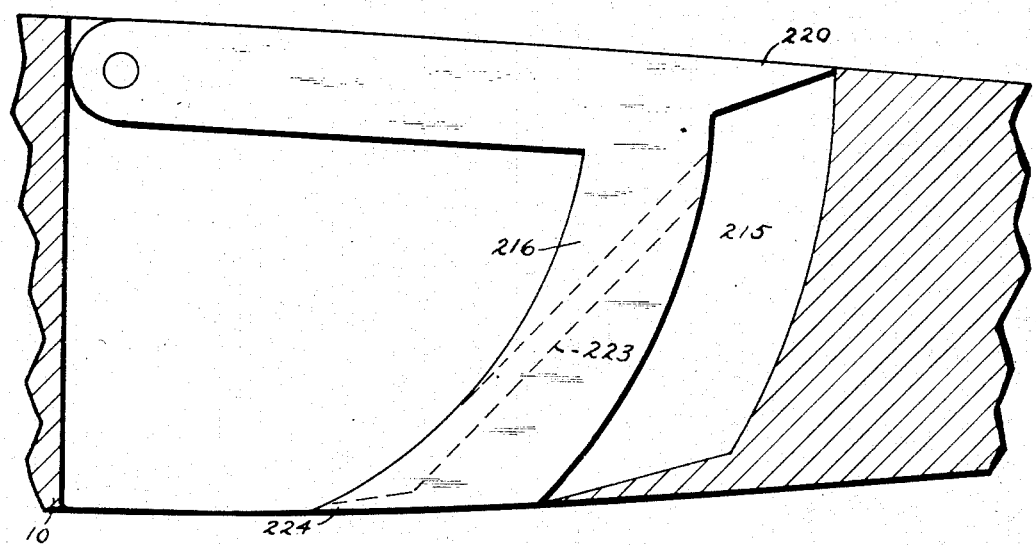
Fig. 6 is an enlarged sectional view of another slightly modified form of the invention.

There is shown at 10 an airplane wing extending from the side of the fuselage 11 and having its trailing edge 12 provided with a wind brake or other lift increasing device 13, which may extend the full span of the wing 10 and as far as 14, if desired, although it will be understood that this invention is equally applicable to a wing having no lift increasing device thereon.

Extending parallel to the lateral axis of the wing 10 is a slot 15 in which the lateral control plug or aileron 16 of this invention is located. This plug or aileron 16 is mounted on hinges 17 pivoted at 18 within the wing 10, these hinges 17 being preferably located at opposite ends of the plug or aileron 16, the wing 10 being provided with suitable recesses permitting pivotal movement of the hinges 17. Suitable and conventional control mechanisms connect hinges 17 to the controls in the fuselage so that when the aileron of one wing is moved upwardly, the other one is moved downwardly, and vice versa, permitting both ailerons to reach or depart from neutral position simultaneously, but in opposite directions, as customary.

The plug 16 may extend as a solid curved section between the hinges 17, and is of less thickness than the width of the slot 15, the plug 16 and slot 15 being both curved, as shown, with the pivot 18 as the center of curvature. Extending rearwardly from the upper edge of the plug 16 is a lip 20 completing the width of the slot 15, while extending forwardly at the lower edge of the slot 15 is another lip 21, which reaches substantially to the outer curved surface of the plug 16. As a result of such construction when the plugs are in neutral position, that is, the full line position shown in Fig. 2, and in Fig. 3, the slot 15 is substantially closed, leaving a substantially uninterrupted air flow surface on both the top and bottom of the wing 10. When the plug 16 is raised to the position 161 lip 20 moves to the position 201 and the slot 15 is opened, permitting a flow of air therethrough, causing the plug 16 in position 161 to act as a spoiler while the lip 21 acts as a scoop, directing air through the slot. When deflected downwardly, that is, with the plug 16 in the position 162 and the lip 20 in the position 202, there is no slot opening through the wing.

Thus, in normal operation of the controls, the rolling moment is effected by the spoiler position of plug 16 in position 161 on one wing, causing the desirable dip and rolling moment of that wing for controlling the flight of the aircraft.

By making slight modifications, as brought out in the additionally modified forms hereinafter described, some of the characteristics of the rolling moment, time response and yawing moment, as well as hinge moments, are somewhat improved. In Figs. 4 and 5, the lip 120 has its upper surface placed at a slight rearward angle to the surface of the wing 110, while the plug 116 is provided with a plurality of substantially horizontal slots 22 extending therethrough beneath the lip 120. These slots 22 will preferably be about one inch in width and will be spaced about an inch apart from each other. In addition, a plurality of similarly spaced internal slots 23 may extend from the lower forward edge 24 of the plug or aileron 116 upwardly and rearwardly to about the middle of slot 115.

The presence of the upper rear angle on the lip 120 assists in maintaining the plug 116 in neutral position. When the plug 116 commences its movement toward the position 1161, the slot 22 meeting the air flow over the upper surface of wing 110 resists initial movement. At the same time the slot 23 in the plug in the other wing being simultaneously deflected toward position 1162, builds up positive air pressure within the slot 115 to assist in returning the aileron or plug 116 to the neutral position in Fig. 5, the total area of the slots 23 being substantially greater than the total escape area about the lip 120 to provide this desirable positive pressure.

In Fig. 6 the plug 216 is shown as provided with upwardly angular slots 223 extending from just above its forward lower edge 224 to the slot 215. However no upper horizontal slot is used below the lip 220 as in the form just previously described.

Figure 7:
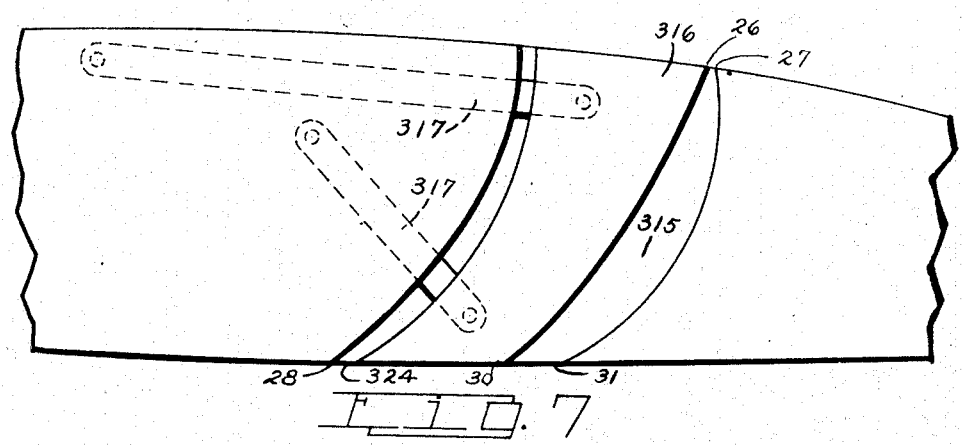

In the form shown in Fig. 7, the plug 316 is shaped somewhat differently with its upper rear edge 26 extending closely adjacent the upper rear edge 27 of the slot 315, while the lower forward edge 324 of the plug 316 is substantially close to the forward lower edge 28 of slot 315. The lower rear edge 30 of plug 316 is spaced substantially forward of the lower rear edge 31 of slot 315. The curvature of the walls of the plug 316 and the slot 315 is such that when the plug 316 is moved upwardly on its pivoted hinges 317, the slot 315 is open, permitting air flow therethrough, but the slot is maintained substantially closed when the plug 316 in the other wing is simultaneously deflected downwardly.

In the form shown in Fig. 8, the plug or aileron 416 is provided with an upper hinge 32 pivoted thereto and to the wing 410 forward of the slot 415, while another hinge 33 is pivoted in the wing 410 rearwardly of the slot 415 and adjacent the lower edge of plug or aileron 416. The curvature of the walls of the plug and slot are as shown, whereby when the plug 416 is raised upwardly the slot is opened behind the plug 416, for the lower forward edge 424 of plug 416 follows the forward wall of the slot, while the rearward edge 430 moves away from the rear wall of the slot 415, and at the same time the upper forward wall of plug 416 approaches the upper forward edge of the slot 415, while the rear wall of the plug 416 moves away from the upper rear edge of slot 415, providing a substantial slot therethrough. When being deflected downwardly, however, the upper rear edge 429 of plug 416 follows closely along the rear wall of slot 415, while the forward wall of plug 416 follows closely along the forward lower edge of slot 415, thus keeping the slot closed.

Figure 9:
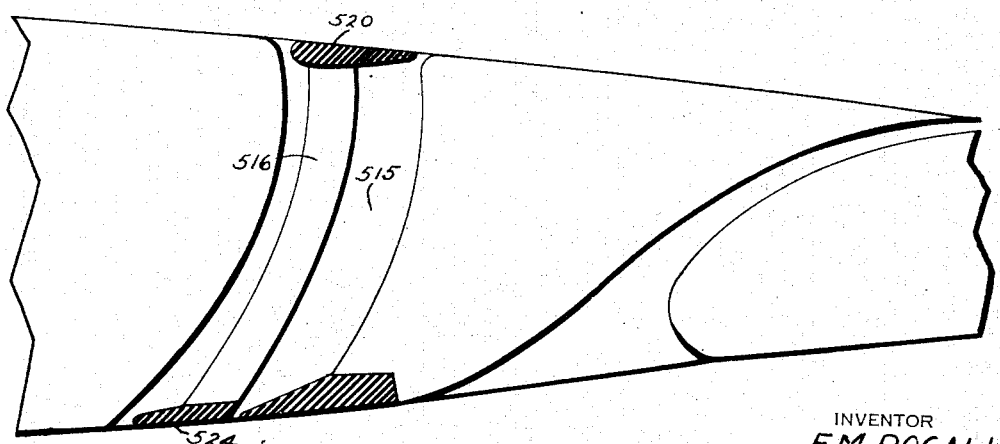
Fig. 9 is an enlarged sectional view, showing a form including the icing means.

In Fig. 9, the plug 516 has its upper lip 520 made of semi-flexible rubber and its lower edge 524 of similar material, while a lip 521 on the lower rear edge of the slot 515 is likewise of rubber. The structure and operation of this form is otherwise similar to the form shown in Figs. 2 and 3. However, when in regions where ice tends to form, the semi-flexible rubber edges and lips tend to vibrate during operation or under the weight of the ice, thereby cracking the ice and shaking the ice free therefrom.

Other modifications and changes in the proportions and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

I claim:

1. In an airplane wing, lateral control means comprising walls forming a slot extending through the wing from the lower to the upper surface thereof, a single plug pivotally held in said slot, said plug being of a length substantially equal to the thickness of said wing, the thickness of said plug being substantially less than the width of said slot, said plug being movable along the forward wall of said slot, a lip at the upper edge of said plug extending rearwardly a distance substantially equal to the width of said slot, a lip at the bottom edge of said rear slot wall extending forwardly therefrom to the rear wall of said plug, said plug being movable through said slot from a neutral position in said slot to a position extending either below said wing or above said wing, said plug lip cooperating with said slot wall lip to maintain said slot closed while said plug is entirely within or extending partly below said wing and leaving said slot open when said plug is extending partly above said wing.

2. In an airplane wing, lateral control means comprising walls forming a slot extending through the wing from the lower to the upper surface thereof, a single plug pivotally held in said slot, said plug being of a length substantially equal to the thickness of said wing, the thickness of said plug being substantially less than the width of said slot, said plug being movable along the forward wall of said slot, a lip at the upper edge of said plug extending rearwardly a distance substantially equal to the width of said slot, a lip at the bottom edge of said rear slot wall extending forwardly therefrom to the rear wall of said plug, said plug being movable through said slot from a neutral position in said slot to a position extending either below said wing or above said wing, said plug lip cooperating with said slot wall lip to maintain said slot closed while said plug is entirely within or extending partly below said wing and leaving said slot open when said plug is extending partly above said wing, said plug having a plurality of openings extending therethrough, located just below said lip thereon.

3. In an airplane wing, lateral control means comprising walls forming a slot extending through the wing from the lower to the upper surface thereof, a single plug pivotally held in said slot, said plug being of a length substantially equal to the thickness of said wing, the thickness of said plug being substantially less than the width of said slot, said plug being movable along the forward wall of said slot, a lip at the upper edge of said plug extending rearwardly a distance substantially equal to the width of said slot, a lip at the bottom edge of said rear slot wall extending forwardly therefrom to the rear wall of said plug, said plug being movable through said slot from a neutral position in said slot to a position extending either below said wing or above said wing, said plug lip cooperating with said slot wall lip to maintain said slot closed while said plug is entirely within or extending partly below said wing and leaving said slot open when said plug is extending partly above said wing, said plug having a plurality of slotted openings extending therethrough from the lower forward edge thereof diagonally upward to within said slot when said plug is in neutral position.

4. In an airplane wing, lateral control means comprising walls forming a slot extending through the wing from the lower to the upper surface thereof, a single plug pivotally held in said slot, said plug being of a length substantially equal to the thickness of said wing, the thickness of said plug being substantially less than the width of said slot, said plug being movable along the forward wall of said slot, a lip at the upper edge of said plug extending rearwardly a distance substantially equal to the width of said slot, a lip at the bottom edge of said rear slot wall extending forwardly therefrom to the rear wall of said plug, said plug being movable through said slot from a neutral position in said slot to a position extending either below said wing or above said wing, said plug lip cooperating with said slot wall lip to maintain said slot closed while said plug is entirely within or extending partly below said wing and leaving said slot open when said plug is extending partly above said wing, said plug having a plurality of slotted openings extending therethrough from the lower forward edge thereof diagonally to within said slot when said plug is in neutral position, the total area of said slotted openings being somewhat greater than the total escape area of said wing slot when said plug is in the lower position, thereby providing a positive pressure assisting in restoring said plug to the neutral position.

FRANCIS MELVIN ROGALLO.